No. 786,052. PATENTED MAR. 28, 1905.
A. C. ROEBUCK.
LENS BOX FOR STEREOPTICONS, &c.
APPLICATION FILED JULY 5, 1904.

Attest:
John Enders
M. H. Holmes

Inventor:
Alvah C. Roebuck,
by Robert Burns
Attorney.

No. 786,052.

Patented March 28, 1905.

UNITED STATES PATENT OFFICE.

ALVAH C. ROEBUCK, OF CHICAGO, ILLINOIS.

LENS-BOX FOR STEREOPTICONS, &c.

SPECIFICATION forming part of Letters Patent No. 786,052, dated March 28, 1905.

Application filed July 5, 1904. Serial No. 215,447.

*To all whom it may concern:*

Be it known that I, ALVAH C. ROEBUCK, a citizen of the United States of America, and a resident of Chicago, in the county of Cook and State of Illinois, have invented certain new and useful Improvements in Lens-Boxes for Stereopticons, &c., of which the following is a specification.

The present invention relates to the lens box or housing of a stereopticon or like apparatus, and has for its object to provide a simple and efficient support for the pair of plano-convex lenses generally employed and which is adapted to hold the lenses in proper alinement with the optical axis of the apparatus and in a manner which admits of the removal and replacement of an individual lens in a ready and rapid manner when from accident or otherwise a change is necessary to the proper working of the apparatus, all as will hereinafter more fully appear and be more particularly pointed out in the claims.

Figure 1:
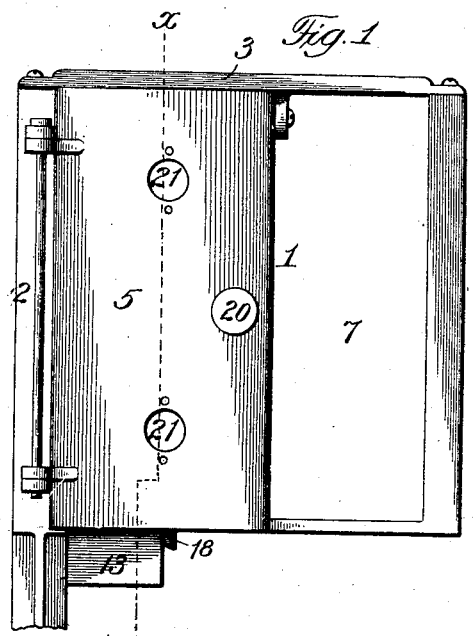
Figure 2:
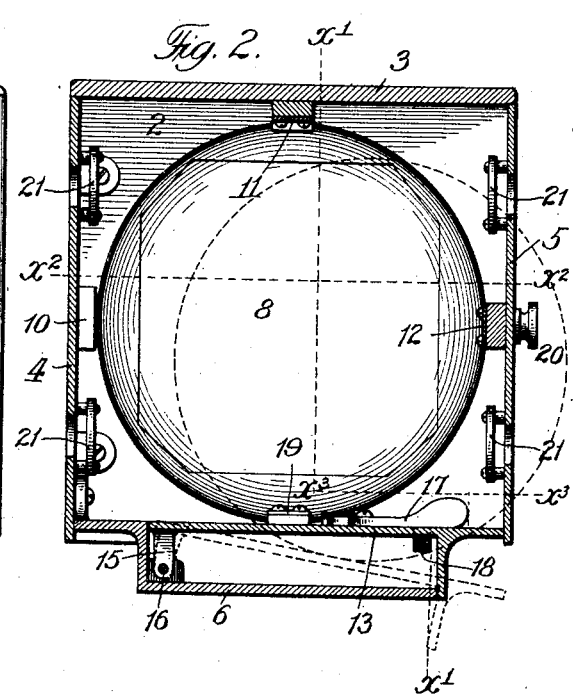
Figure 3:
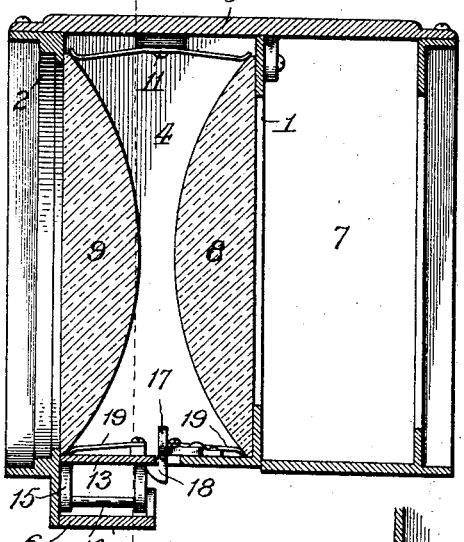
Figure 4:
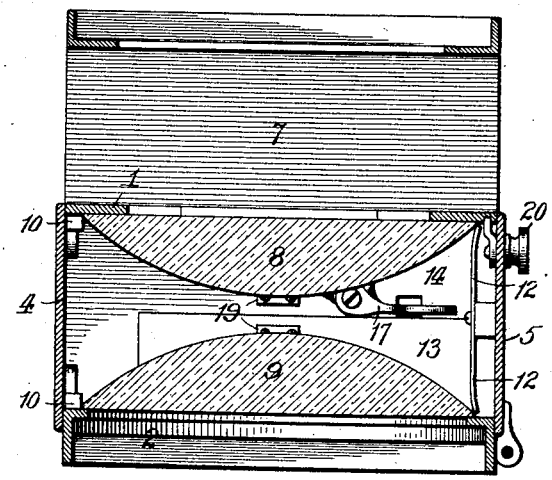
Figure 5:
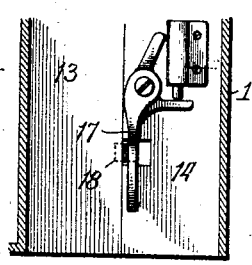

In the accompanying drawings, illustrative of the present invention, Figure 1 is a side elevation of the lens-box. Fig. 2 is a transverse section at line $x\ x$, Figs. 1 and 3. Fig. 3 is a longitudinal section at line $x'\ x'$, Fig. 2. Fig. 4 is a horizontal section at line $x^2\ x^2$, Fig. 2; Fig. 5, a fragmentary horizontal section at line $x^3\ x^3$, Fig. 2.

Similar numerals of reference indicate like parts in the several views.

As represented in the drawings the present lens-box is of the ordinary rectangular form and comprises in detail the front and rear walls 1 and 2, formed with the usual alined light orifices or passages, the fixed horizontal top 3, the fixed vertical side wall 4, the vertically-arranged door 5, forming the companion side wall of the lens-box, and the chambered bottom 6, the floor of which is provided with one or more tilting platforms, as hereinafter specified.

7 is the usual transverse passage for the slide-carrier of a stereopticon or the like.

8 and 9 are the pair of plano-convex lenses, constituting the condenser of a stereopticon or like apparatus and which are housed in the interior of the lens-box with their flat faces in contact with the inner faces of the respective front and rear walls 1 and 2, as shown.

10 represents centrally-arranged projections on the respective walls 1 and 2, forming stop-abutments for the respective lenses 8 and 9 to insure the proper alinement of the lens-axis with the focal axis of the apparatus.

11 is a spring attached centrally to the inner face of the top 3, with its free ends adapted to bear upon the top portion of the lenses to yieldingly maintain the same in proper position against the front and rear walls of the lens-box, as illustrated in Fig. 3.

12 is a spring attached centrally to the inner face of the door 5, with its free ends adapted to bear upon the side portions of the lenses to yieldingly maintain the same in proper abutting position against the before-mentioned abutment projections 9 and as illustrated in Fig. 4.

13 is a tilting platform, which in the preferred form of the present invention is arranged under the rear lens 9 and forms, in connection with the stationary floor-section 14, the floor of the lens-box. Such platform is pivoted at one end in the chambered bottom portion 6 of the lens-box by pivot-lugs 15 and pintle 16, as shown, and forms a rest for the lower end of the rear lens 9. When required, the floor-section 14 above described may be replaced by a second tilting platform similar to the one just described without departing from the spirit of this part of the present invention.

17 is a spring-catch pivoted to the lens-box floor-section 14 and provided with a pendent hook portion 18, adapted to engage beneath the tilting platform 13 to support the same in its normal horizontal position.

19 represents individual springs attached to the upper faces of the tilting platform 13 and floor-section 14, with their free ends adapted to bear against the lower edges of the lenses to yieldingly press said lenses against the faces of the respective front and rear walls 1 and 2 of the lens-box.

20 is a catch of any usual construction on the door 5 for securing said door in its closed position.

21 represents hooded ventilating openings or orifices in the vertical side wall 4 and in the door 5 for the purpose of affording a circulation of air within the lens-box during actual use of the apparatus. Such hooded ventilating-orifices may be provided in other portions of the lens-box at the judgment of the constructor without departing from the spirit of the present improvement.

With the present improved construction the proper position of the lenses are insured, and they are yieldingly held in such position in a very effective manner, while at the same time a rapid and convenient removal and replacement of one or both lenses can be attained by the simple operations of opening the door 5 and disengaging one or both of the spring-catches 17, when one or both of the lenses will roll out into the hands of the operator to be replaced by a reversed manipulation of the parts.

Having thus fully described my said invention, what I claim as new, and desire to secure by Letters Patent, is—

1. The combination of a lens-box, a lens-supporting platform pivoted in the lower portion of said box, and means to secure said platform in a horizontal position.

2. The combination of a lens-box, a lens-supporting platform pivoted at one end in the lower portion of said box, and a locking means engaging the free end of said platform to hold the same in a horizontal position.

3. The combination of a lens-box having a chambered bottom, a lens-supporting platform pivoted by means of depending lugs and a pintle-pin in said chambered bottom, and a spring-catch on the lens-box adapted for engagement beneath said lens-supporting platform.

4. The combination of a lens-box, a lens-supporting platform pivoted in the lower portion of said box, a spring on said platform the free end of which is adapted to have yielding engagement with the lower end of the lens, and means for securing said platform in a horizontal position.

5. The combination of a lens-box having a door at one side, a central projection on the inside of the box forming an abutment for the side edge of the lens, and a spring on said door adapted to have yielding engagement with the side of the lens opposite to the aforesaid abutment projection.

6. The combination of a lens-box having a door at one side, a central projection on the inside of the box forming an abutment for the side edge of the lens, a spring on said door adapted to have yielding engagement with the side of the lens opposite to the aforesaid abutment projection, and a spring secured within the lens-box and adapted to have yielding engagement with the top edge of the lens.

7. The combination of a lens-box, a lens-supporting platform pivoted in the lower portion of said box, a spring on said platform having its free end adapted to yieldingly engage the lower end of the lens, means for securing said platform in a horizontal position, a door at one side of the lens-box, a central projection on the inside of the lens-box forming an abutment for the side edge of the lens, a spring on said door adapted to have yielding engagement with the side of the lens opposite the aforesaid abutment projection, and a spring secured within the lens-box and adapted to have yielding engagement with the top edge of the lens.

Signed at Chicago, Illinois, this 1st day of July, 1904.

ALVAH C. ROEBUCK.

Witnesses:
ROBERT BURNS,
M. H. HOLMES.